Feb. 15, 1966  J. R. SOLUM  3,235,295
WELDED FRICTION CLAMP COLLAR
Filed June 13, 1961  3 Sheets-Sheet 1

INVENTOR.
JAMES R. SOLUM
BY *Lyon & Lyon*
ATTORNEYS

Feb. 15, 1966  J. R. SOLUM  3,235,295
WELDED FRICTION CLAMP COLLAR
Filed June 13, 1961  3 Sheets-Sheet 2

INVENTOR.
JAMES R. SOLUM
BY
*Lyon & Lyon*
ATTORNEYS

Feb. 15, 1966    J. R. SOLUM    3,235,295
WELDED FRICTION CLAMP COLLAR
Filed June 13, 1961                    3 Sheets-Sheet 3

INVENTOR.
JAMES R. SOLUM
BY *Lyon+Lyon*
ATTORNEYS

United States Patent Office 3,235,295
Patented Feb. 15, 1966

3,235,295
WELDED FRICTION CLAMP COLLAR
James R. Solum, Los Angeles, Calif., assignor to B & W Incorporated, Torrance, Calif., a corporation of California
Filed June 13, 1961, Ser. No. 116,789
7 Claims. (Cl. 287—52)

This invention relates to a stop collar for use in positioning centralizers, cement baskets, scratchers, and the like, on oil well casing and in particular is directed to use as a stop collar wherein a minimum annular space occupied by the stop collar is desired.

In the drilling and completion of oil wells, there are numerous situations where an apparatus must be positioned on the exterior of the well casing or liner and the axial movement of that apparatus along the casing must be limited in some manner. In some situations, it is possible for the apparatus to be installed "over" the well casing coupling which in turn limits the axial movement of the apparatus. In many other situations, however, it may be impossible, impractical or undesirable to place the apparatus over the casing coupling and in such situations some form of stop lug or collar must be installed on the external surface of the casing.

Although it is common practice under many circumstances to weld a lug or ring directly to the external surface of the casing, there are numerous situations where this may be undesirable. One of such situations is encountered when certain types of oil well casing are being employed which are not readily welded or would produce an unsatisfactory bond between the casing and the lug or ring. There are also situations where the well casing is to be re-used after the removal of the apparatus installed thereon and in such situations, it may be damaging to the casing to attempt to cut or break the weld bond between the casing and the ring or lug.

In many applications due to the relative dimensions of the casing and the well bore, or due to the particular structure of the apparatus to be positioned on the exterior of the casing, it is desirable that the stop collar or ring used have a very minimum radial thickness and that there are no substantial radially projecting protuberances on the stop collar. For example, if a stop collar having a substantial radial protuberance were installed on a casing between the collars of a centralizer, and such protuberance became positioned directly beneath a centralizer bow or stave, there may be permanent and objectionable damage to the bow or stave when the casing is urged in the direction of that bow during the course of running the casing into the well.

It is, therefore, an object of this invention to provide a stop collar for well casing in which means are provided for securing such collar to the well casing without welding directly to the casing, and wherein a very minimum and relatively uniform radial thickness is obtained.

Another object of this invention is to provide a stop collar in which means are provided for using a separate apparatus for causing circumferential tensioning of the collar, and wherein portions of the collar may be welded together to maintain such tensioning whereby axial movement of the stop collar along the casing is resisted by the frictional engagement of the internal surface of the collar with the external surface of the casing.

A further object of this invention is to provide a stop collar useable with an apparatus for causing circumferential tensioning of the collar resulting in frictional engagement between the collar and the well casing, wherein means are provided integral with the stop collar which may be welded together to maintain such circumferential tensioning after the removal of such apparatus, and wherein such means are so formed as to resist contact between the weld and the well casing.

A further and more specific object of this invention is to provide a split ring stop collar which may be installed on a well casing being of a size either larger or smaller than the nominal size of such well casing even where such size is larger or smaller than standard mill tolerances.

Other and more detailed objects and advantages of this invention will appear from the following description and the accompanying drawings.

Figure 1:
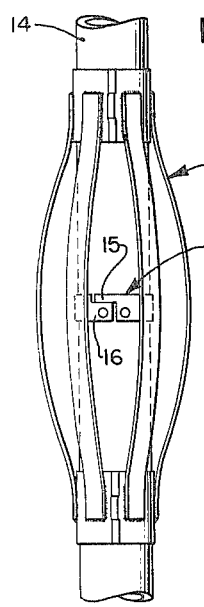
FIGURE 1 is an elevational view showing the device of this invention installed on a well casing between the collars of a centralizer.

Referring now to the drawings, the split ring collar, generally designated 10, has two juxtaposed end portions 11 and 12, and a generally cylindrical portion 13 prior to securing the collar 10 to the well casing 14 as hereinafter described. The end portions 11 and 12 are movable relative to each other by use of force and relative movement thereof results in an expansion or contraction of the effective diameter of the cylindrical portion 13. This ease of expansion permits the collar 10 to be slipped over a well casing coupling (not shown) or over an "external upset" type of pipe coupling.

Figure 2:
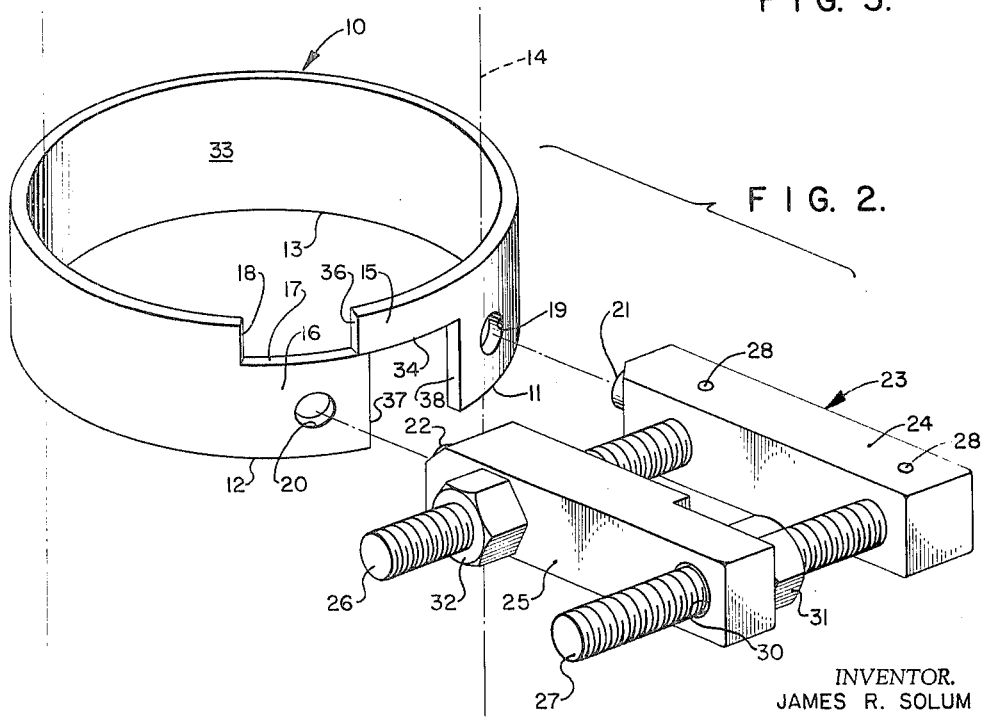
FIGURE 2 is a perspective view of the collar device and an apparatus for circumferentially tensioning the device.
Figure 4:
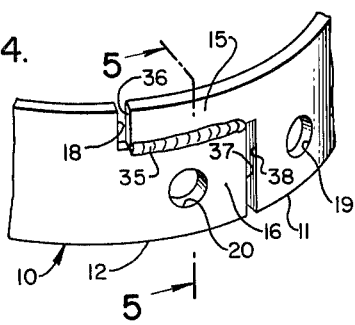
FIGURE 4 is a fragmentary perspective view showing the device as welded after application to the well casing.
Figure 5:
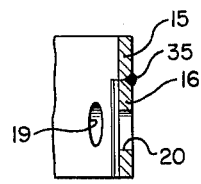
FIGURE 5 is a sectional elevational view taken substantially on the line 5—5 of FIGURE 4.

The end portion 11 of the collar 10 is provided with an integral element or projection 15 extending circumferentially toward the end portion 12. As illustrated in FIGURE 2, I prefer that the element 15 be positioned at one axial extremity of the collar. An element or projection 16 integral with end portion 12 extends toward end portion 11. The end portion 12 has a slot defined by circumferentially extending edge 17 of element 16 and the axially extending edge 18 for receiving the element 15.

The end portions 11 and 12 are each provided with apertures 19 and 20, respectively, which are adapted to receive post element 21 and 22, respectively, of the tensioning apparatus, generally designated 23. Although I have illustrated a modified form of a parallel bar clamp, it is readily apparent that any apparatus capable of causing circumferential movement of the apertures 19 and 20 toward each other would be suitable. As shown in the drawings, the tensioning apparatus 23 has a pair of bars 24 and 25 connected by threaded studs 26 and 27 which are fixedly mounted in the bar 24 by pins 28. The bar 25 has over-sized bores 29 and 30 for loosely receiving the studs 26 and 27, respectively. A nut 31 is threaded on the stud 27 between the two bars 24 and 25, and a second nut 32 is threaded on stud 26 on the side of the bar 25 remote from bar 24. Thus, it can be seen by progressively tightening the nuts 31 and 32 toward bar 24, the post 22 is progressively moved toward the post 21.

Installation of the collar 10 on a well casing is accomplished by slipping the collar axially onto the casing to the position desired, inserting the posts 21 and 22 of the tensioning apparatus 23 into the apertures 19 and 20, respectively, and progressively moving the posts 21 and 22 closer together as heretofore described, thereby causing the collar 10 to be contracted onto the exterior of the well casing. The apertures 19 and 20 may be offset relative to a plane normal to the axis of the collar, with aperture 19 above aperture 20 as shown in FIGURES 1 and 2, whereby the circumferential tensioning will also urge edges 17 and 34 toward each other.

The tensioning apparatus 23 is tightened appropriately to cause hoop tensioning of the cylindrical portion 13 of the collar thereby resulting in normal or radial forces between the collar and the casing to produce frictional engagement between the internal surface 33 of the collar and the external surface of the casing. The hoop tensioning is of sufficient magnitude to cause adequate frictional engagement to resist axial movement of the collar along the casing. The edge 17 and edge 34 of end portions 12 and 11, respectively, are secured together by any convenient means such as weld 35 thereby maintaining the hoop tensioning of the cylindrical portion 13 of the collar 10 after removal of the tensioning apparatus 23. Since the edges 17 and 34 are substantially circumferential the hoop tension will result in placing the weld 35 in shear rather than tension thereby resulting in a structurally more effective joint.

The relative dimensions of the well casing 14 and the cylindrical portion 13 are such that axially extending edges 18 and 36, and 37 and 38, of end portions 12 and 11, both respectively, do not contact each other until adequate hoop tensioning has been induced in the cylindrical portion 13, as heretofore described. While I have illustrated the apertures 19 and 20, as circular holes, they may be of any convenient shape which results in shoulders 39 and 40, respectively, adapted for engagement with the posts of a tensioning apparatus.

The collar 10 may be used in various ways where it is desired to restrict axial movement of a device along the casing, such as, welding it to such device (not shown), by placing it between the collars of a device having two collars such as a centralizer and slipping both onto the casing (not shown), by slipping the collar on the casing and installing as described and then installing a hinged centralizer 9 over the collar (as shown in FIGURE 1), or by similar other methods.

Figure 6:
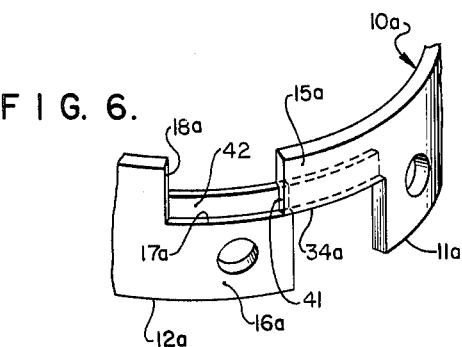
FIGURE 6 is a fragmentary perspective view showing a modified form of the portion of the device to be welded.
Figure 7:
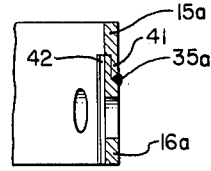
FIGURE 7 is a sectional elevational view similar to FIGURE 5 showing the modified form of FIGURE 6, after welding.

In the modified form of my invention shown in FIGURES 6 and 7, the circumferentially extending edges of the element and slot are modified to eliminate all possibility of inadvertent welding of the collar to the casing. The element 15a has an axially extending flange portion 41 of approximately half the thickness of the remaining portion of the element 15a. The element 16a of end portion 12a has an axially extending flange portion 42 partially projecting into the slot defined by axially extending edge 18a and circumferentially extending edge 17a. The edge 34a of flange 41 is adjacent the edge 17a of element 16a and the edges are connected by weld metal 35a after application and tensioning of the collar 10a. As best shown in FIGURE 7, the flange 42 of this modified form serves as a "back-up" for welding thereby substantially eliminating inadvertent welding of the collar to the casing.

Figure 8:
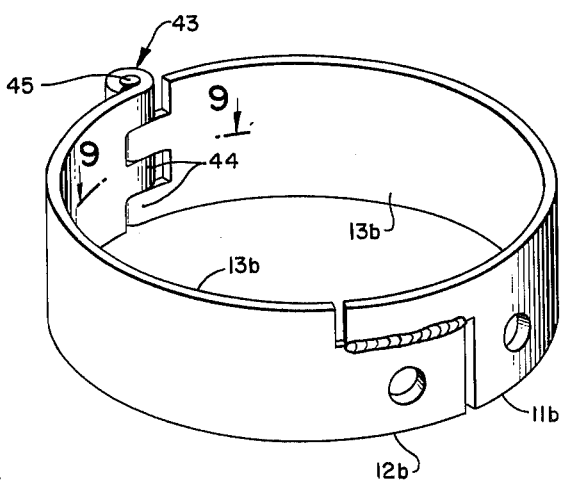
FIGURE 8 is a perspective view showing a second modified form.
Figure 9:
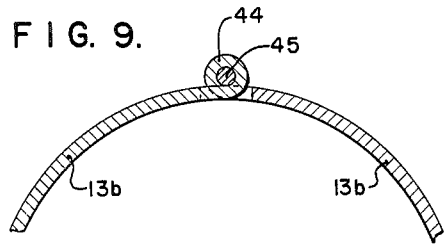
FIGURE 9 is a sectional plan view taken substantially on the line 9—9 of FIGURE 8.

In the modified form of my invention illustrated in FIGS. 8 and 9, the generally cylindrical portion of the collar is comprised of two hinged halves rather than one continuous band as illustrated in the preferred embodiment. The hinge assembly 43 is comprised of a pair of tubular shaped elements 44 on each semi-cylindrical half 13b which are joined by a hinge pin 45 extending through the tubular elements 44. The end portions 11b and 12b may be formed in accordance with the preferred embodiment illustrated in FIGURE 2 or the modified form thereof illustrated in FIGURE 6. Although the tubular elements 44 create a radial protuberance which exceeds the thickness of the collar, the convenience of a hinge device may, in certain situations, overcome this undesirable protuberance.

Figure 3:
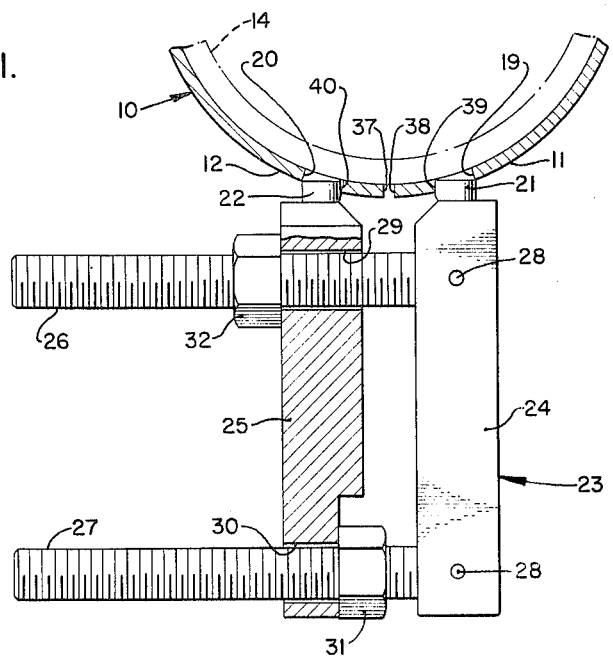
FIGURE 3 is a partial sectional plan view showing the interengagement of the collar device and the tensioning apparatus.
Figure 10:
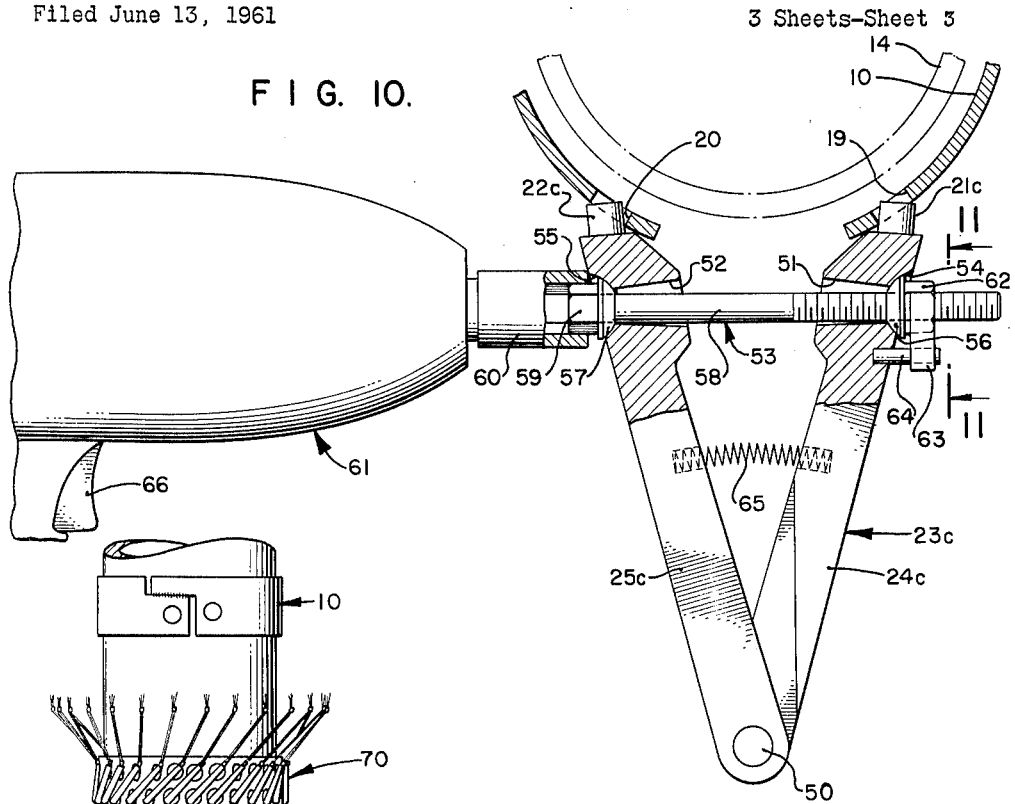
FIGURE 10 is a plan view similar to FIGURE 3 showing a different apparatus for tensioning the device.
Figure 11:
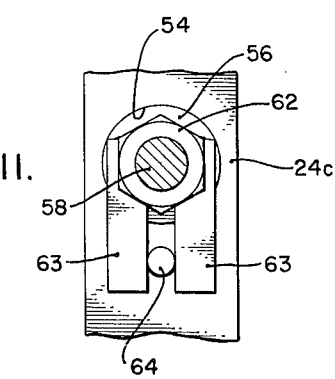
FIGURE 11 is a sectional view taken substantially on the line 11—11 of FIGURE 10.

In the modified form of tensioning apparatus shown in FIGURES 10 and 11, a hinged scissors-like structure is employed with a single bolt for tightening the apparatus rather than the parallel bar structure with two bolts shown in FIGURES 2 and 3. The tensioning apparatus, generally designated 23c, has a pair of bars, 24c and 25c pivotally connected at one end by hinge pin 50. The bars 24c and 25c are provided with slotted holes 51 and 52, respectively, near their unpivoted ends for receiving a bolt assembly 53. The holes 51 and 52 are provided with spherical seats 54 and 55, respectively, for receiving the spherical washers 56 and 57, respectively, of bolt assembly 53. The bolt 58 has a conventional hex head 59 for engaging the hex socket 60 of an impact wrench 61 to tighten or loosen the bolt assembly. The nut 62 is threadedly mounted on the threaded end of the bolt 58 and is prevented from turning by means of a pair of lugs 63 welded to the nut and adapted to engage pin 64 mounted on the bar 24c. A compression spring 65 is mounted between bars 24c and 25c to urge them apart in order to maintain interengagement between lugs 63 and pin 64.

In use, the posts 21c and 22c of the apparatus 23c are inserted in the apertures 19 and 20, respectively, and the socket 60 of impact wrench 61 is fitted over the bolt head 59 and the wrench is actuated by trigger 66 to cause tightening of the bolt assembly and a resultant circumferential tensioning of the collar 10 on the casing 14.

Figure 12:
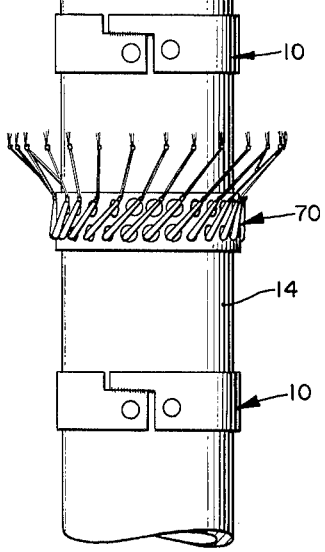
FIGURE 12 is an elevational view showing devices of this invention installed on a casing to prevent axial movement of scratchers.

In FIGURE 12 the collars of this invention are shown in a typical installation where axial movement of a pair of conventional scratchers 70 along the casing 14 is limited by the three collars 10.

Thus, it may be seen that a stop collar is provided which presents a maximum resistance to axial movement along the casing for a very minimum thickness of the collar and which requires no welding directly to the casing.

Having fully described my invention, it is to be understood that I do not wish to be limited to the details herein set forth or to the details illustrated in the drawings, but my invention is of the full scope of the appended claims.

I claim:

1. In a stop collar which may be clamped to encircle a well casing by use of an apparatus to cause circumferential tensioning and wherein welding may be used to retain such tensioning without such welding contacting the well casing, the combination of: a collar having two juxtaposed end portions, a projection on each end portion, a circumferential contacting edge on each projection, said edges being substantially normal to the axis of the said collar, the said edge of one projection being adjacent the said edge of the other projection, an axially extending flange on each projection along said edges, said flanges being radially offset and in overlapping relationship with each other, and each end portion having an aperture for receiving the tensioning apparatus whereby the said collar is circumferentially tensioned on the well casing by advancing said end portions toward each other for causing frictional forces between the collar and the well casing to resist relative movement therebetween and said tensioning is retained by welding said edges one to the other.

2. The combination of claim 1 in which the said collar is comprised of two half-collars hinged at a point diametrically opposed to said end portions.

3. The combination of claim 1 in which the said apertures are axially offset from each other and circumferentially spaced whereby the said edges are urged into engagement with each other by the circumferential tensioning of the collar.

4. In a stop collar which may be clamped to encircle a well casing by use of an apparatus to cause circumferential tensioning and wherein welding may be used to retain such tensioning without such welding contacting the well casing, the combination of: a collar having two juxtaposed end portions, a projection on each end portion, a circumferential contacting edge on each projection, said edges being substantially normal to the axis of the said collar, the said edge of one projection being adjacent the said edge of the other projection, an axially extending flange on each projection along said edges, said flanges being radially offset and in overlapping relationship with each other, one of said projections being substantially wider in an axial direction than the other said projection, the wider of said projection having an aperture axially spaced from the said edge thereof, the end portion having the narrower of said projection also having an aperture circumferentially spaced from said projection, and the said apertures being adapted for receiving the tensioning apparatus whereby the said collar is circumferentially tensioned on the well casing by advancing said end portions toward each other for causing frictional forces between the collar and the well casing to resist relative movement therebetween and said tensioning is retained by welding said edges one to the other.

5. In a stop collar which may be clamped to encircle a well casing by use of an apparatus to cause circumferential tensioning and wherein welding may be used to retain such tensioning without such welding contacting the well casing, the combination of: a collar having two juxtaposed end portions, a projection on each end portion, a circumferential contacting edge on each projection, said edges being substantially normal to the axis of said collar, the said edge of one projection being adjacent the said edge of the other projection, one of said projections being substantially wider in an axial direction than the other said projection, the wider of said projections having an aperture axially spaced from the said edge thereof, the end portion having the narrower of said projections also having an aperture circumferentially spaced from said projection and the said apertures being adapted for receiving the tensioning apparatus whereby the said collar is circumferentially tensioned on the well casing by advancing said end portions toward each other and said tensioning is retained by welding said edges one to the other for causing frictional forces between the collar and the well casing to resist relative movement therebetween, said collar being comprised of two half-collars hinged at a point diametrically opposed to said end portions.

6. In a stop collar which may be clamped to encircle a well casing by use of an apparatus to cause circumferential tensioning and wherein welding may be used to retain such tensioning without such welding contacting the well casing, the combination of: a collar having two juxtaposed end portions, a projection on each end portion, a circumferential contacting edge on each projection, said edges being substantially normal to the axis of the said collar, the said edge of one projection being adjacent the said edge of the other projection, one of said projections being substantially wider in an axial direction than the other said projection, the wider of said projections having an aperture axially spaced from the said edge thereof, the end portion having the narrower of said projections also having an aperture circumferentially spaced from said projection, and the said apertures being adapted for receiving the tensioning apparatus whereby the said collar is circumferentially tensioned on the well casing by advancing said end portions toward each other and said tensioning is retained by welding said edges one to the other for causing frictional forces between the collar and the well casing to resist relative movement therebetween, the said apertures are axially offset from each other and circumferentially spaced whereby the said edges are urged into engagement with each other by the circumferential tensioning of the collar.

7. In a stop collar which is clamped to encircle a well casing by use of an apparatus to cause circumferential tensioning of the collar, the combination of: a collar having juxtaposed end portions, one end portion having a circumferentially extending element, the other end portion having a slot for receiving said element, said slot having a circumferential edge adjacent said element, said element having a circumferential edge adjacent to and engaging said slot edge, each end portion having an aperture for receiving the tensioning apparatus whereby the said collar is circumferentially tensioned on the well casing by advancing said end portions toward each other for causing frictional forces between the collar and the well casing to resist relative movement therebetween, and weld means joining said edges whereby said tensioning is retained after withdrawal of the tensioning apparatus.

References Cited by the Examiner

UNITED STATES PATENTS

| 1,229,498 | 6/1917 | Moratta | 277—220 |
| 1,436,774 | 11/1922 | Mummert | 277—220 |
| 2,101,311 | 12/1937 | Dunean | 285—286 |
| 2,811,889 | 11/1957 | Wurzel | 287—52 |
| 2,893,758 | 7/1959 | Dufour et al. | 285—286 |

FOREIGN PATENTS

| 241 | 9/1899 | Austria. |
| 332,418 | 8/1903 | France. |
| 87,216 | 6/1896 | Germany. |
| 131,773 | 5/1951 | Sweden. |

CARL W. TOMLIN, *Primary Examiner.*

WALTER A. SCHEEL, *Examiner.*